US012639735B2

(12) United States Patent     (10) Patent No.:   US 12,639,735 B2

Charlton et al.           (45) Date of Patent:     May 26, 2026

(54) SERVING A UNIFIED CATALOG TO MULTIPLE CLIENT GROUPS USING CATALOG SURFACES

(71) Applicant: Maplebear Inc., San Francisco, CA (US)

(72) Inventors: Alex Charlton, San Francisco, CA (US); Mohammad Wasiuddin Ahmed, Pleasanton, CA (US); Dov Schnaider, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 330 days.

(21) Appl. No.: 18/234,267

(22) Filed: Aug. 15, 2023

(65) Prior Publication Data

US 2025/0061500 A1     Feb. 20, 2025

(51) Int. Cl.
    *G06Q 30/00*       (2023.01)
    *G06Q 30/0601*     (2023.01)

(52) U.S. Cl.
    CPC ..... *G06Q 30/0621* (2013.01); *G06Q 30/0603* (2013.01); *G06Q 30/0627* (2013.01)

(58) Field of Classification Search
    CPC .............. G06Q 30/00; G06Q 30/0601; G06Q 30/0621; G06Q 30/0631; G06Q 30/0641
    See application file for complete search history.

(56) References Cited

U.S. PATENT DOCUMENTS

| | | | |
|---|---|---|---|
| 2004/0030697 A1* | 2/2004 | Cochran ................. | G06F 16/95 |
| | | | 707/999.009 |
| 2004/0122690 A1* | 6/2004 | Willoughby ......... | G06Q 10/083 |
| | | | 705/337 |
| 2007/0106570 A1* | 5/2007 | Hartman ............ | G06Q 30/0605 |
| | | | 705/26.8 |
| 2009/0164323 A1* | 6/2009 | Byrne ................ | G06Q 30/0271 |
| | | | 705/14.56 |
| 2012/0059848 A1* | 3/2012 | Krishnamoorthy .... | G06Q 50/01 |
| | | | 709/204 |

(Continued)

OTHER PUBLICATIONS

Shieh, Evan, et al. "Attribute Similarity and Relevance-Based Product Schema Matching for Targeted Catalog Enrichment." 2021 IEEE International Conference on Big Knowledge (ICBK). IEEE, 2021. (Year: 2021).*

(Continued)

*Primary Examiner* — Christopher B Seibert
(74) *Attorney, Agent, or Firm* — Fenwick & West LLP

(57)        ABSTRACT

An online system maintains a catalog of items and allows client applications to access variations of items from the catalog. A particular variation of items of the catalog is referred to as a catalog surface. The online system determines a catalog surface corresponding to a request for items received from a client application. The system identifies attribute values of the requested items that correspond to the catalog surface. Different client applications can access different variations of the attribute value for the same item corresponding to different catalog surfaces. The system maintains a surface-to-surface mapping to process data for sparsely populated catalog surfaces. If attribute values for a sparse catalog surface are not available, the system identifies an alternate catalog surface from the surface-to-surface mapping and uses values from the alternate catalog surface.

20 Claims, 4 Drawing Sheets

(56)                   References Cited

U.S. PATENT DOCUMENTS

| | | | |
|---|---|---|---|
| 2012/0123837 A1* | 5/2012 | Wiesner | G06Q 30/0631 |
| | | | 705/26.7 |
| 2013/0006816 A1* | 1/2013 | Nuzzi | G06Q 30/0639 |
| | | | 705/27.1 |
| 2013/0166725 A1* | 6/2013 | Liyanage | G06Q 10/10 |
| | | | 709/224 |
| 2019/0163829 A1* | 5/2019 | Puri | G06Q 30/02 |
| 2021/0019351 A1* | 1/2021 | Dixon | G06F 16/90335 |
| 2023/0106590 A1* | 4/2023 | Di Fabbrizio | G06N 20/00 |
| | | | 705/26.63 |
| 2024/0095350 A1* | 3/2024 | Withnell | G06F 21/554 |
| 2024/0098114 A1* | 3/2024 | Withnell | H04L 63/1441 |
| 2024/0146611 A1* | 5/2024 | Vichare | H04L 41/145 |
| 2024/0193061 A1* | 6/2024 | Hamlin | G06F 11/3051 |
| 2024/0273182 A1* | 8/2024 | Hamlin | G06F 9/4411 |
| 2025/0061500 A1* | 2/2025 | Charlton | G06Q 30/0621 |

OTHER PUBLICATIONS

Kagie, Martijn, Michiel Van Wezel, and Patrick JF Groenen. "Map based visualization of product catalogs." Recommender Systems Handbook. Boston, MA: Springer US, 2010. 547-576. (Year: 2010).*

\* cited by examiner

310
Receive attributes of item from a data source

320
Determine surface corresponding to the data source

330
Store attribute values for item in association with the surface

340
Provide access to item via various surfaces

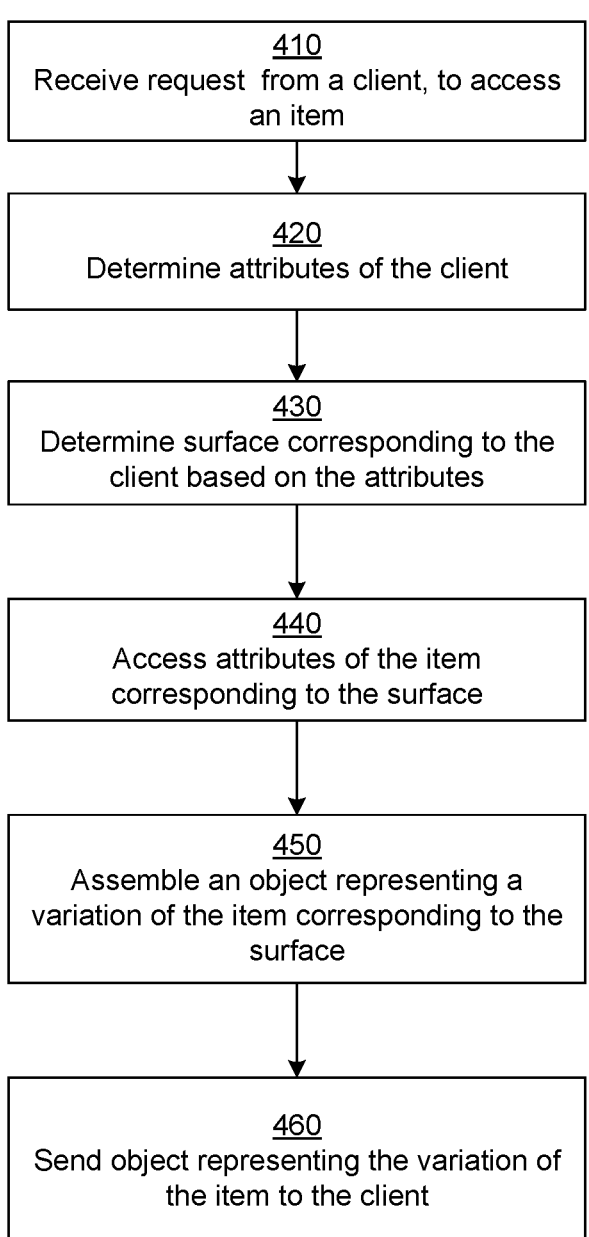

410
Receive request from a client, to access an item

420
Determine attributes of the client

430
Determine surface corresponding to the client based on the attributes

440
Access attributes of the item corresponding to the surface

450
Assemble an object representing a variation of the item corresponding to the surface

460
Send object representing the variation of the item to the client

FIG. 4

SERVING A UNIFIED CATALOG TO MULTIPLE CLIENT GROUPS USING CATALOG SURFACES

TECHNICAL FIELD

One or more aspects described herein relate generally to storing data in database systems and more specifically to providing variations of items stored in a catalog to client applications.

BACKGROUND

Systems such as online systems often use databases to store a catalog comprising data of items. The items may represent physical entities or categories of physical entities. Various client applications may access the catalog. The catalog may store data describing items that are accessed by a large number of requests received from client applications, for example, browsers of client devices. Due to the large number of requests processed by a database system storing a catalog, the performance of the database system processing these requests has a significant impact on the performance of the client applications based on the catalog data. Slow performance of the catalog requests adversely affects the performance of client applications accessing the catalog.

SUMMARY

In accordance with one or more aspects of the disclosure, a system stores a catalog in a database. The catalog comprises data describing items. The system provides variations of items to client applications. An item is represented as a mapping from attribute identifiers to attribute values. An attribute of an item may be associated with a plurality of attribute values, each of the plurality of attribute values associated with a distinct catalog surface. The system receives a request for items from a client device. The system determines a catalog surface associated with the request based on a context of the request. The system generates a result set comprising variations of items corresponding to the catalog surface by performing the following steps. The system identifies a set of items based on the request. For each item from the set of items, the system adds a record representing a variation of the item using attribute values mapped to the catalog surface associated with the request. The system sends the result set to the client device. Allowing different client applications to access different catalog surfaces allows client applications to use different variations of the items based on a context associated with the client application.

According to one or more embodiments, the system stores a mapping from catalog surfaces to catalog surfaces. The mapping associates a source catalog surface to a target catalog surface. The system builds the result set by adding records representing variations of the item as follows. The system checks if an attribute value associated with the source catalog surface is available for an attribute. If the system determines that there is no attribute value associated with the source catalog surface for that item, the system uses the attribute value associated with the target catalog surface for the item. Reuse of data stored for a particular catalog surface for other catalog surfaces results in improved storage efficiency of the system.

BRIEF DESCRIPTION OF THE DRAWINGS

FIG. 4 is a flowchart illustrating the overall process of accessing data describing items that are stored in the data store, according to one or more embodiments.

The figures depict various embodiments for purposes of illustration only. One skilled in the art will readily recognize from the following discussion that alternative embodiments of the structures and methods illustrated herein may be employed without departing from the principles of the present disclosure.

The features and advantages described in this summary and the following detailed description are not all-inclusive. Many additional features and advantages will be apparent in view of the drawings, specification, and claims.

DETAILED DESCRIPTION

An online system maintains a catalog for storing data describing items. The items may represent different types of entities, for example, products. An item may also represent a category of entities, for example, a type of product as opposed to instances of the product. The data describing the items may be accessed by various clients. A client may represent a client application executing on a client device associated with one or more users. For example, catalog data may be accessed by web applications that receive requests from web browsers. A client may access the online system via APIs (application programming interfaces) of the catalog.

The online system allows a client application to access a variation of an item. A particular variation of the items of the catalog is referred to as a catalog surface. In an online system in which items represent products, a particular catalog surface may correspond to in-store attributes if the item was purchased from a physical store. Another catalog surface may correspond to market-place attributes representing item attributes that the catalog presents to clients accessing the catalog for purchasing an item from a marketplace interface. Another surface may correspond to virtual store attributes provided to clients accessing the catalog for purchasing an item from a virtual store.

System Environment

Figure 1:
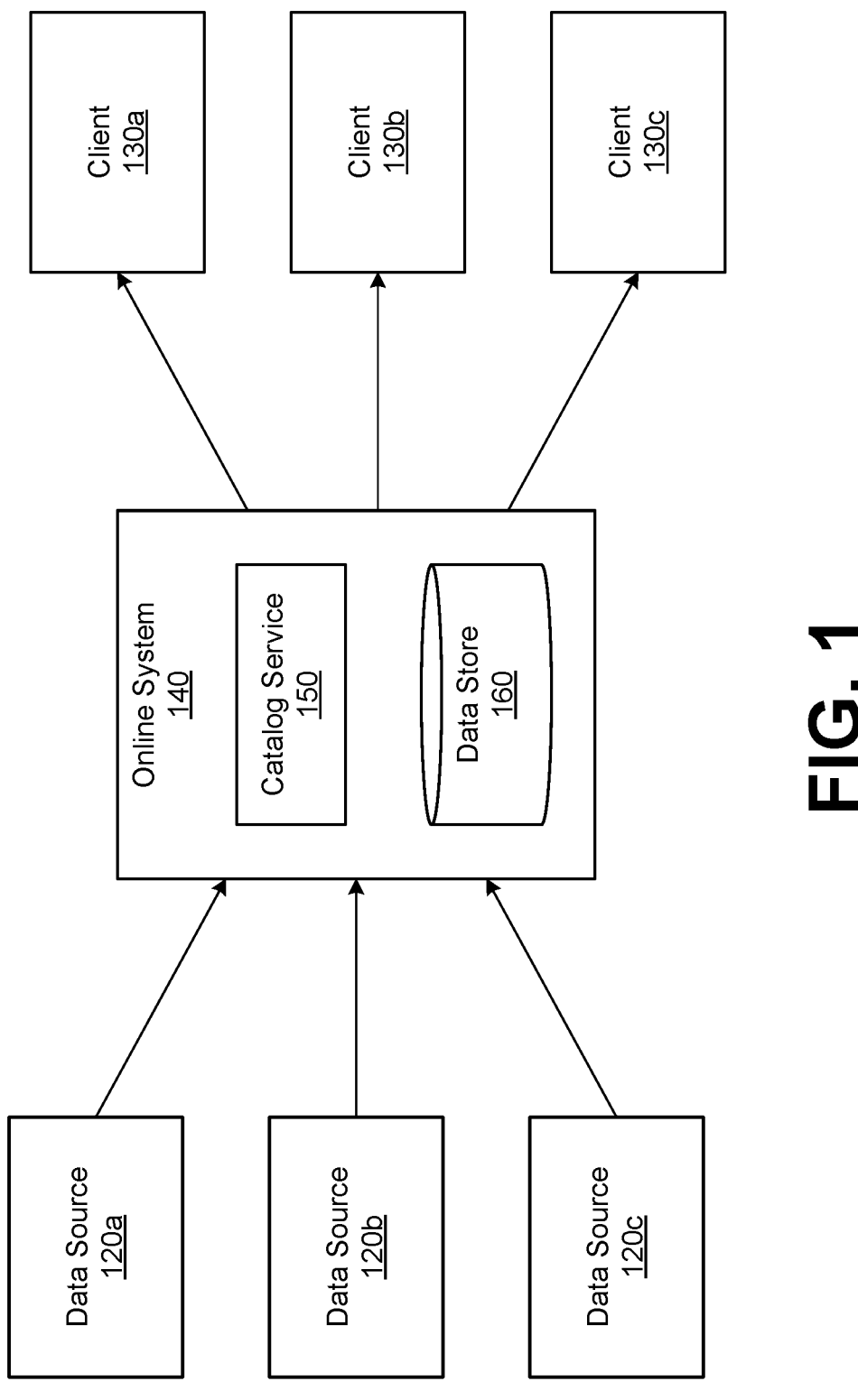
FIG. 1 shows an example system environment of an online system including a unified catalog service, according to one or more embodiments.

FIG. 1 shows an example system environment of an online system including a unified catalog service, according to one or more embodiments. The system environment comprises an online system 140, one or more data source 120a, 120b, 120c that provide data to the online system, and one or more client devices 130a, 130b, 130c that access the online system 140. Other embodiments may include more or fewer systems than indicated in FIG. 1.

The online system 140 ingests items from the data sources 120. If an item is determined to exist in the catalog, the online system 140 merges the attributes received with the existing set of attributes. If the online system determines that the item does not exist in the catalog, the online system may create a new item in the catalog. Different data sources may provide different variations of item attributes, each variation corresponding to a catalog surface.

The online system 140 stores the catalog comprising attributes of the items in the data store 160. Different clients 130a, 130b, 130c access items from the catalog. A client 130 may access a variation of the item corresponding to a catalog surface. The catalog service 150 allows the data sources 120 to provide variations of items using catalog surfaces and clients 130 to access specific variations of the item using the appropriate catalog surface. The requests to provide item attributes to the catalog or access items are performed using APIs of the catalog service 150.

A group of clients may access a particular surface. The group of clients may have a particular set of characteristics. For example, a group of clients that access the catalog for in-store purchases of items may be associated with a particular catalog surface. A group of clients that access the catalog for purchases of items via a marketplace may be associated with another catalog surface. The catalog surface associated with a request may be determined by the online system based on information associated with the request, for example, the type of application used to send the request, the user interface used for sending the request, a physical location of the client device from where the request was sent, a user account used by the client application for sending the request, and so on.

An item is uniquely identified by an item identifier. The same item identified by a particular item identifier may have a set S1 of attribute values for a set of attributes when accessed via a particular surface and a different set S2 of attribute values for the same set of attributes when accessed by a different surface. For example, an attribute may represent a display name, an image of the item, a flag indicating whether the item is available or not, or a number representing a number of items available, a value of the item, and so on. Accordingly, when accessed via a catalog surface S1, the item with item identifier ID1 may return an object or a record with attributes comprising display name N1, image I1, availability A1, and price V1. When accessed via a catalog surface S2, the item with item identifier ID1 may return an object or a record with attributes comprising display name N2, image I2, availability A2, and value V2.

The variation of an item presented via a catalog surface may be used for subsequent processing, for example, for a transaction performed by the user. For example, a transaction via a catalog surface S1 may use an attribute value V1 of attribute A1 of the item I1, whereas a transaction via a catalog surface S2 may use an attribute value V2 of the same attribute A1 of the item I1. Similarly, assume that an attribute A1 represents availability of an item. If the availability of the item indicated by the attribute value of attribute A2 according to catalog surface S1 indicates that the item is not available, the online system may not allow a transaction based on the item, for example, by disabling the user interface for executing the transaction based on the item. In contrast, if the availability of the item indicated by the attribute value of attribute A2 according to catalog surface S2 indicates that the item is currently available, the online system may allow a transaction based on the item.

Figure 2:
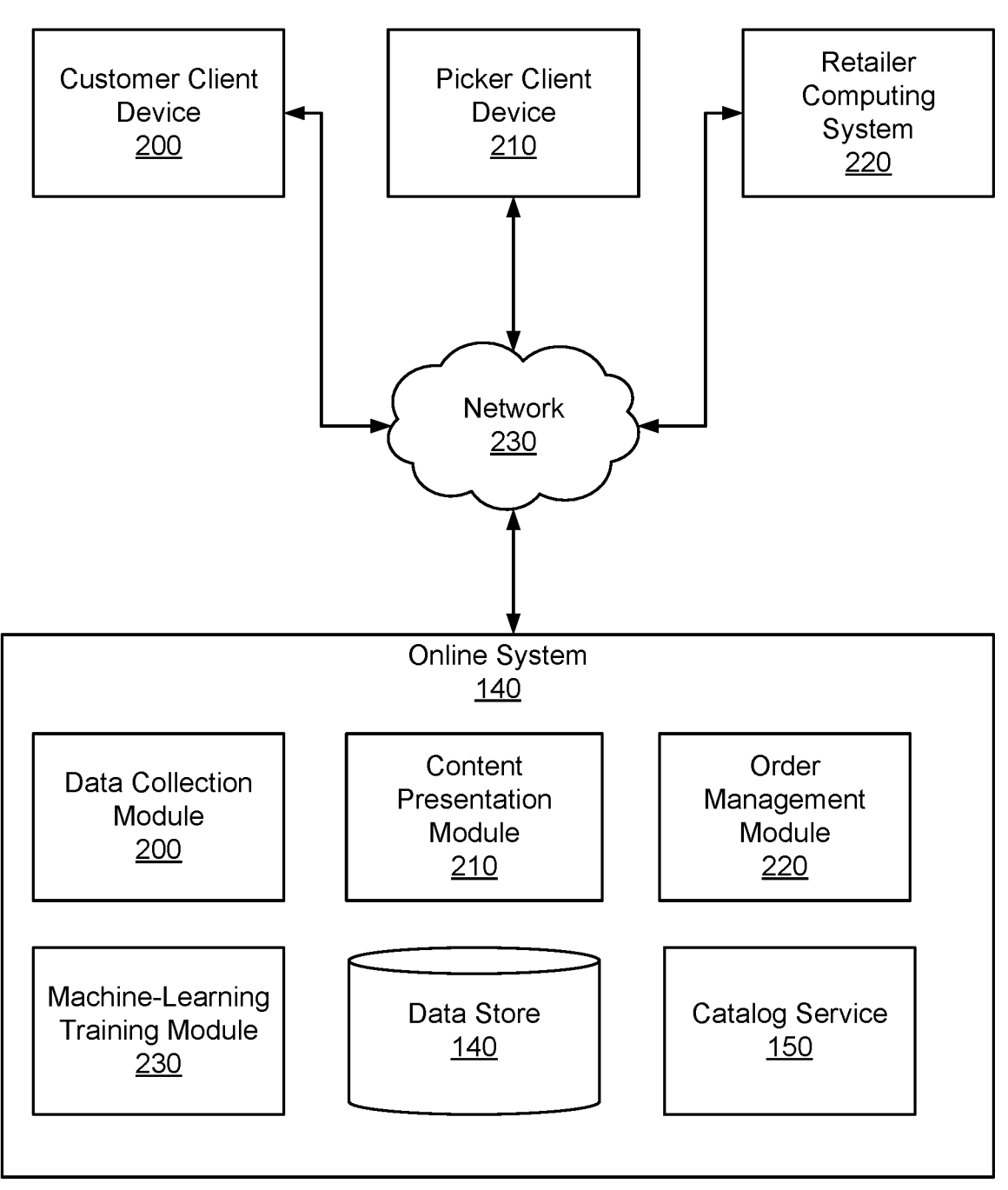
FIG. 2 illustrates another example system environment for an online system using the unified catalog service, according to one or more embodiments.

FIG. 2 illustrates another example system environment for an online system using the unified catalog service, according to one or more embodiments. The online system shown in FIG. 2 may also be referred to as an online concierge system. The system environment illustrated in FIG. 1 includes a customer client device 200, a picker client device 210, a retailer computing system 220, a network 230, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 200, picker client device 210, and retailer computing system 220 are illustrated in FIG. 1, any number of customers, pickers, and retailers may interact with the online system 140. As such, there may be more than one customer client device 200, picker client device 210, or retailer computing system 220.

The customer client device 200 is a client device through which a customer may interact with the picker client device 210, the retailer computing system 220, or the online system 140. The customer client device 200 can be a personal or mobile computing device, such as a smartphone, a tablet, a laptop computer, or desktop computer. In some embodiments, the customer client device 200 executes a client application that uses an application programming interface (API) to communicate with the online system 140.

A customer uses the customer client device 200 to place an order with the online system 140. An order specifies a set of items to be delivered to the customer. An "item", as used herein, means a good or product that can be provided to the customer through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 200 presents an ordering interface to the customer. The ordering interface is a user interface that the customer can use to place an order with the online system 140. The ordering interface may be part of a client application operating on the customer client device 200. The ordering interface allows the customer to search for items that are available through the online system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 200 may receive additional content from the online system 140 to present to a customer. For example, the customer client device 200 may receive coupons, recipes, or item suggestions. The customer client device 200 may present the received additional content to the customer as the customer uses the customer client device 200 to place an order (e.g., as part of the ordering interface).

Additionally, the customer client device 200 includes a communication interface that allows the customer to communicate with a picker that is servicing the customer's order. This communication interface allows the user to input a text-based message to transmit to the picker client device 210 via the network 230. The picker client device 210 receives the message from the customer client device 200 and presents the message to the picker. The picker client device 210 also includes a communication interface that allows the picker to communicate with the customer. The picker client device 210 transmits a message provided by the picker to the customer client device 200 via the network 230.

In some embodiments, messages sent between the customer client device 200 and the picker client device 210 are transmitted through the online system 140. In addition to text messages, the communication interfaces of the customer client device 200 and the picker client device 210 may allow the customer and the picker to communicate through audio or video communications, such as a phone call, a voice-over-IP call, or a video call.

The picker client device 210 is a client device through which a picker may interact with the customer client device 200, the retailer computing system 220, or the online system 140. The picker client device 210 can be a personal or mobile computing device, such as a smartphone, a tablet, a laptop computer, or desktop computer. In some embodiments, the picker client device 210 executes a client application that uses an application programming interface (API) to communicate with the online system 140.

The picker client device 210 receives orders from the online system 140 for the picker to service. A picker services an order by collecting the items listed in the order from a retailer. The picker client device 210 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 210 transmits to the online system 140 or the customer client device 200 which items the picker has collected in real time as the picker collects the items.

The picker can use the picker client device 210 to keep track of the items that the picker has collected to ensure that the picker collects all of the items for an order. The picker client device 210 may include a barcode scanner that can determine an item identifier encoded in a barcode coupled to an item. The picker client device 210 compares this item identifier to items in the order that the picker is servicing, and if the item identifier corresponds to an item in the order, the picker client device 210 identifies the item as collected. In some embodiments, rather than or in addition to using a barcode scanner, the picker client device 210 captures one or more images of the item and determines the item identifier for the item based on the images. The picker client device 210 may determine the item identifier directly or by transmitting the images to the online system 140. Furthermore, the picker client device 210 determines a weight for items that are priced by weight. The picker client device 210 may prompt the picker to manually input the weight of an item or may communicate with a weighing system in the retailer location to receive the weight of an item.

When the picker has collected all of the items for an order, the picker client device 210 instructs a picker on where to deliver the items for a customer's order. For example, the picker client device 210 displays a delivery location from the order to the picker. The picker client device 210 also provides navigation instructions for the picker to travel from the retailer location to the delivery location. When a picker is servicing more than one order, the picker client device 210 identifies which items should be delivered to which delivery location. The picker client device 210 may provide navigation instructions from the retailer location to each of the delivery locations. The picker client device 210 may receive one or more delivery locations from the online system 140 and may provide the delivery locations to the picker so that the picker can deliver the corresponding one or more orders to those locations. The picker client device 210 may also provide navigation instructions for the picker from the retailer location from which the picker collected the items to the one or more delivery locations.

In some embodiments, the picker client device 210 tracks the location of the picker as the picker delivers orders to delivery locations. The picker client device 210 collects location data and transmits the location data to the online system 140. The online system 140 may transmit the location data to the customer client device 200 for display to the customer, so that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 210 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 210 that they can use to interact with the online system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 220 is a computing system operated by a retailer that interacts with the online system 140. As used herein, a "retailer" is an entity that operates a "retailer location," which is a store, warehouse, or other building from which a picker can collect items. The retailer computing system 220 stores and provides item data to the online system 140 and may regularly update the online system 140 with updated item data. For example, the retailer computing system 220 provides item data indicating which items are available at a particular retailer location and the quantities of those items. Additionally, the retailer computing system 220 may transmit updated item data to the online system 140 when an item is no longer available at the retailer location. Additionally, the retailer computing system 220 may provide the online system 140 with updated item prices, sales, or availabilities. Additionally, the retailer computing system 220 may receive payment information from the online system 140 for orders serviced by the online system 140. Alternatively, the retailer computing system 220 may provide payment to the online system 140 for some portion of the overall cost of a user's order (e.g., as a commission).

The customer client device 200, the picker client device 210, the retailer computing system 220, and the online system 140 can communicate with each other via the network 230. The network 230 is a collection of computing devices that communicate via wired or wireless connections. The network 230 may include one or more local area networks (LANs) or one or more wide area networks (WANs). The network 230, as referred to herein, is an inclusive term that may refer to any or all of standard layers used to describe a physical or virtual network, such as the physical layer, the data link layer, the network layer, the transport layer, the session layer, the presentation layer, and the application layer. The network 230 may include physical media for communicating data from one computing device to another computing device, such as multiprotocol label switching (MPLS) lines, fiber optic cables, cellular connections (e.g., 3G, 4G, or 5G spectra), or satellites. The network 230 also may use networking protocols, such as TCP/IP, HTTP, SSH, SMS, or FTP, to transmit data between computing devices. In some embodiments, the network 230 may include Bluetooth or near-field communication (NFC) technologies or protocols for local communications between computing devices. The network 230 may transmit encrypted or unencrypted data.

The online system 140 is an online system by which customers can order items to be provided to them by a picker from a retailer. The online system 140 receives orders from a customer client device 200 through the network 230. The online system 140 selects a picker to service the customer's order and transmits the order to a picker client device 210 associated with the picker. The picker collects the ordered items from a retailer location and delivers the ordered items to the customer. The online system 140 may charge a customer for the order and provide portions of the payment from the customer to the picker and the retailer.

As an example, the online system 140 may allow a customer to order groceries from a grocery store retailer. The customer's order may specify which groceries they want delivered from the grocery store and the quantities of each of the groceries. The customer's client device 200 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 210 by the online system 140. The online system 140 is described in further detail below with regards to FIG. 2.

According to one or more embodiments, the online system 140 includes a data collection module 200, a content presentation module 210, an order management module 220, the data store 140, and the catalog service 150. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 140. The data collection module 200 may receive attributes values for items of catalogs from various data sources 120 and store them as catalog data in the data store 140. The data collection module 200 determines the catalog surface for a set of attribute values received for an item and stores the attribute values in association with the catalog surface for the item. The data collection module 200 may determine the catalog surface based on the data source 120 that is providing the attribute values. The data collection module 200 may infer the catalog surface from one or more attributes provided by the data sources 120. For example, if the data includes attribute values for an attribute named in_store_ _price, the system infers that the catalog surface represents in-store variation of items. In general, the online system checks for availability of attribute values for a particular attribute and if the input data includes attribute values for that particular attribute, the online system determines that the catalog surface is a particular catalog surface determined to be associated with that particular attribute. The online system may maintain a mapping from names of specific attributes to catalog surfaces and if the data being ingested includes attribute values for an attribute identified in the mapping, the online system determines that the catalog surface for the data being ingested is the catalog surface mapped to that attribute.

According to one or more embodiments, the online system normalizes the attributes. For example, the online system stores items using a canonical set of attribute names. The data received during ingestion may include different attribute names than the attribute name used in the stored data of the catalog. The online system stores a mapping from possible attribute names received in the input data to the attribute names of the canonical representation used in the stored catalog. The online system uses the attribute names to determine the catalog surface of the input data and converts the attribute name of the input data to the canonical attribute names of the catalog. The online system stores the canonical attribute name in association with the catalog surface identifier corresponding to the catalog surface determined for the input data. For example, the input data may include an attribute named in_store_price that is mapped to the canonical attribute name price. The system identifies the in_ store_price attribute in the input data and infers that the catalog surface is in-store that is identified using the in_sto- re_id catalog surface identifier. The online system stores the in_store_price attribute value as the price attribute of the item and stores the price attribute in conjunction with the in_store_id catalog surface identifier.

The data collection module 200 may only collect data describing a user if the user has previously explicitly consented to the online system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 200 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data.

Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 220, a picker client device 210, or the customer client device 200.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 210 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 140.

In some embodiments, the content presentation module 210 scores items based on a search query received from the customer client device 200. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 200 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 210 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 210 to determine when the picker arrives at the retailer location. When the picker arrives at the retailer location, the order management module 220 transmits the order to the picker client device 210 for display to the picker. As the picker uses the picker client device 210 to collect items at the retailer location, the order management module 220 receives item identifiers for items that the picker has collected for the order. In some embodiments, the order management module 220 receives images of items from the picker client device 210 and applies computer-vision techniques to the images to identify the items depicted by the images. The order management module 220 may track the progress of the picker as the picker collects items for an order and may transmit progress updates to the customer client device 200 that describe which items have been collected for the customer's order.

In some embodiments, the order management module 220 tracks the location of the picker within the retailer location. The order management module 220 uses sensor data from the picker client device 210 or from sensors in the retailer location to determine the location of the picker in the retailer location. The order management module 220 may transmit, to the picker client device 210, instructions to display a map of the retailer location indicating where in the retailer location the picker is located. Additionally, the order management module 220 may instruct the picker client device 210 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 210 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 210. The order management module 220 may also transmit navigation instructions to the picker client device 210 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 200 and the picker client device 210. As noted above, a customer may use a customer client device 200 to send a message to the picker client device 210. The order management module 220 receives the message from the customer client device 200 and transmits the message to the picker client device 210 for presentation to the picker. The picker may use the picker client device 210 to send a message to the customer client device 200 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The data store 140 stores data used by the online system 140. The data store 140 uses computer-readable media to store data and may use databases to organize the stored data. For example, the data store 140 stores customer data, item data, order data, and picker data for use by the online system 140. Accordingly, the data store 140 stores the catalog that comprises data describing items and item categories. According to one or more embodiments, the data store 140 represents item categories as items. Each item is represented as a set of attributes. Each item has an item identifier that uniquely identifies the item. Some of the attributes of an item may be associated with multiple surfaces. Accordingly, the value of an attribute may be stored as a pair of a surface identifier and an attribute value. Each value of the attribute is stored in association with an attribute identifier, for example, the attribute name.

An attribute may have a single value independent of the catalog surfaces. The attribute value of such an attribute may be stored in association with a null surface represented using a null surface identifier. Accordingly, the attribute value is applicable to all surfaces.

The catalog service 150 provides an interface to the items of the catalog. Accordingly, the catalog service 150 receives a request to access an item and determines the catalog surface associated with the request. The catalog service 150 fetches the appropriate set of attributes for the catalog surface. The catalog service assimilates an object or a record representing the variation of the item corresponding to the catalog surface associated with the request and sends the item in response to the request.

Processes

Figure 3:
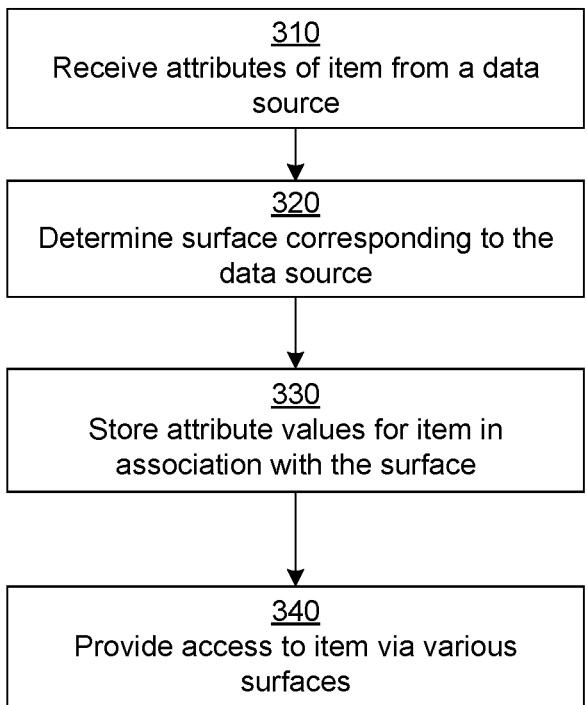
FIG. 3 is a flowchart illustrating the overall process of ingesting data describing items and storing in the data store, according to one or more embodiments.

FIG. 3 is a flowchart illustrating the overall process of ingesting data describing items and storing in the data store, according to one or more embodiments. Alternative embodiments may include more, fewer, or different steps from those illustrated in FIG. 3, and the steps may be performed in a different order from that illustrated in FIG. 3. These steps may be performed by an online system (e.g., online system 140). Additionally, each of these steps may be performed automatically by the online system without human intervention.

The online system 140 receives 310 values of attributes of various items from a data source 120. The online system 140 determines 320 the catalog surface corresponding to the data source. According to one or more embodiments, the online store stores metadata mapping data sources to catalog surfaces. The online system 140 accesses this mapping to identify the catalog surface corresponding to the data source that provided the attribute values.

The online system 140 stores 330 the attribute values for attributes of each item in association with the catalog surface. An item may be stored using one or more records of database tables in a relational database. An item may be stored as a document comprising key-value pairs in a key-value store. According to one or more embodiments, each surface has a surface identifier. Accordingly, a representation of the item in the data store may comprise a mapping from tuples of attribute identifiers and surface identifiers to attribute values. For example, if an attribute identifier is $I_A$, a surface identifier is $I_S$, and an attribute value is $V_A$, the representation of the item comprises a mapping $(I_A, I_S) \rightarrow V_A$. Since each item is identified using an item identifier $I_I$, the mapping for a set of items may be represented as a mapping from a tuple comprising an item identifier, an attribute identifier, and a surface identifier to an attribute value, i.e., $(I_I, I_A, I_S) \rightarrow V_A$. The storage of the attributes as disclosed improves the efficiency of storage of the catalog, for example, compared to systems that store multiple records for storing the same item, one corresponding to each variation.

According to an embodiment, the online system uses two databases to store catalog data. One database is an offline database that performs all of the business logic associated with the catalog. This database stores attributes in the mapping format. The second database is an online database that stores a denormalized item representation including one document per (item, surface) pair. This scheme improves the execution efficiency when performing lookups of this data, at the expense of using more storage space.

The online system 140 provides 340 access to the item via APIs to client applications. A client application accesses a variation of the item corresponding to a particular surface. Details of the process for accessing the items are illustrated in FIG. 4 and described in connection with FIG. 4

FIG. 4 is a flowchart illustrating the overall process of accessing data describing items that is stored in the data store, according to one or more embodiments. Alternative embodiments may include more, fewer, or different steps from those illustrated in FIG. 4, and the steps may be performed in a different order from that illustrated in FIG. 4. These steps may be performed by an online system (e.g., online system 140). Additionally, each of these steps may be performed automatically by the online system without human intervention.

The online system 140 receives 410 a request from a client to access an item or a set of items from the catalog. The client may represent a client application running on a client device. The online system 140 determines 420 attributes of the client. The attributes represent a context associated with the request. The online system 140 determines 430 a catalog surface based on the attributes, i.e., a catalog surface corresponding to the context of the request. For example, an attribute may represent the client application used for sending the request. The attribute may represent a specific user interface used to send the request. The attribute may represent one or more parameters sent in the request. For example, the context of the request may be specified via parameters passed in an API call representing the request.

The online system 140 accesses attributes of the item from the data store that correspond to the catalog surface. For example, the online system 140 may determine the catalog surface identifier that identifies the catalog surface and access all attribute values of the item that are mapped to the catalog surface identifier. The online system 140 assembles 450 an object (or a record) representing a variation of the item corresponding to the catalog surface. The online system 140 sends 460 the object (or the record) representing the variation of the item corresponding to the catalog surface to the client.

According to one or more embodiments, the online system may receive a request for a set of items. The online system 140 obtains variations of each item of the set of items that corresponds to the catalog surface to build a result set. The online system 140 sends the result set to the client.

According to one or more embodiments, a particular attribute value may be applicable to all surfaces. Such an attribute value may be associated with a null surface, i.e., a special identifier used to specify that the attribute value is applicable to all surfaces.

Surface-to-Surface Mappings

According to one or more embodiments, the online system 140 stores a mapping from surfaces to surfaces. Accordingly, the mapping associates a source surface to a target surface and indicates that the attribute value associated with a target surface should be used for an item if the attribute value associated with a source surface is not available. The mapping may be implemented using a table that associates source surface identifiers with target surface identifiers. The mapping specifies that the online system should generate a variation of an item for a source surface using attribute values mapped to the source surface. However, if an attribute value is not available for the source surface, the online system should use the attribute value of the item associated with the target surface.

According to one or more embodiments, the online system 140 may check if an attribute value associated with the source surface is available for an attribute of the item. If the online system 140 determines that there is an attribute value associated with the source surface for that item, the online system 140 uses the attribute value for generating a representation of the variation of the item for the catalog surface. If the online system 140 determines that there is no attribute value associated with the source surface for that item, the online system 140 uses the attribute value associated with the target surface for the item.

The surface-to-surface mapping may be specified such that it is applicable to all attributes of items. According to one or more embodiments, a surface-to-surface mapping may be specified for a subset of attributes of an item. For example, a catalog surface S1 may be mapped to catalog surface S2 for a particular subset of attributes and the catalog surface S1 may be mapped to a different surface S3 for a different subset of attributes. A distinct surface to surface mapping may be specified for each attribute of the item.

According to one or more embodiments, the surface-to-surface mapping may be specified for a subset of items. The subset of items may be specified using expressions based on certain characteristics of the item, for example, expressions based on attribute values. The attribute values used for identifying a subset of items may be based on attributes that are associated with null surface identifiers, i.e., applicable to all surfaces. For example, the subset of items may be determined based on a type of item such as the product type.

The use of surface-to-surface mapping allows reuse of attribute values stored for a surface for other surfaces. This improves the efficiency of storage of attributes since the same attribute value may be used for multiple surfaces. If attribute data is available sparsely for a surface, attribute values stored for other surfaces may be used. For example, if an image attribute is available for an in-store surface, the image attribute is used for display in an application displaying in-store items. However, if the image attribute is not available for the in-store surface, depending on the surface-to-surface mapping, the online system may use an image available for an on-line surface instead. Accordingly, the same image may be used for multiple surfaces corresponding to different contexts.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:

at a computer system comprising a processor and a computer-readable storage medium:

receiving, by a data collection module via a network interface, from a plurality of data sources, data describing a plurality of items, each item represented as a mapping from attribute identifiers to attribute values, wherein a first set of attribute values of an item is received from a first data source in the plurality of data sources, a second set of attribute values of the item is received from a second data source in the plurality of data sources, the first set of attribute values of the item is different from the second set of attribute values of the item, and each of the first set and second set of attribute values of the item is associated with a distinct catalog surface in a plurality of catalog surfaces;

receiving, by a catalog service from a client application executing on a client device, a request for items;

determining, by the catalog service using a context analysis module, one or more attributes describing a context of the request;

identifying, by the catalog service, based on the determined context, a catalog surface from the plurality of catalog surfaces associated with the request, wherein each catalog surface in the plurality of catalog surfaces is a data structure storing a separate set of attribute values for items associated with a corresponding context, and wherein a same item in different catalog surfaces corresponds to different attribute values;

generating, by a result generation module, a result set comprising variations of items corresponding to the catalog surface, comprising:

identifying a set of items based on the request, and for each item of the set of items, adding a record representing a variation of the item using the set of attribute values of the catalog surface associated with the request; and sending, by a content presentation module, the result set to the client device.

2. The method of claim 1, storing a mapping from source catalog surfaces to target catalog surfaces, wherein the mapping associates a source catalog surface to a target catalog surface, wherein adding the record representing the variation of the item comprises:

for an attribute of the item, checking if an attribute value associated with the source catalog surface is available;

determining that there is no attribute value associated with the source catalog surface for that item; and responsive to determining that there is no attribute value associated with the source catalog surface for that item, using the attribute value associated with the target catalog surface for the item.

3. The method of claim 1, storing a mapping from source catalog surfaces to target catalog surfaces, wherein the mapping associates a source catalog surface to a target catalog surface, wherein adding the record representing the variation of the item comprises:

for an attribute of the item, checking if an attribute value associated with the source catalog surface is available;

determining that there is an attribute value associated with the source catalog surface for that item; and responsive to determining that there is an attribute value associated with the source catalog surface for that item, using the attribute value associated with the source catalog surface for that item.

4. The method of claim 1, further comprising:

ingesting attribute values of items from one or more data sources, comprising:

receiving an attribute value for a particular item;

determining a source catalog surface corresponding to the attribute value; and storing the attribute value for the particular item in association with the source catalog surface.

5. The method of claim 4, wherein each data source maps to a catalog surface, wherein determining the catalog surface corresponding to the attribute value comprises:

identifying a data source that provided the attribute value; and determining the catalog surface corresponding to the data source.

6. The method of claim 1, wherein each catalog surface has a catalog surface identifier, wherein each item is represented as a mapping from tuples of attribute identifier and catalog surface identifiers to attribute values.

7. The method of claim 1, wherein an attribute describing the context of the request identifies a client application used for sending the request.

8. The method of claim 1, wherein an attribute describing the context of the request identifies a particular user interface used for sending the request.

9. The method of claim 1, wherein an attribute describing the context of the request represents one or more parameters specified in the request.

10. A non-transitory computer readable storage medium storing instructions that when executed by one or more computer processors cause the one or more computer processors to perform steps comprising:

receiving, by a data collection module via a network interface, from a plurality of data sources, data describing a plurality of items, each item represented as a mapping from attribute identifiers to attribute values, wherein a first set of attribute values of an item is received from a first data source in the plurality of data sources, a second set of attribute values of the item is received from a second data source in the plurality of data sources, the first set of attribute values of the item is different from the second set of attribute values of the item, and each of the first set and second set of attribute values of the item is associated with a distinct catalog surface in a plurality of catalog surfaces;

receiving, by a catalog service from a client application executing on a client device, a request for items;

determining, by the catalog service using a context analysis module, one or more attributes describing a context of the request;

identifying, by the catalog service, based on the determined context, a catalog surface from the plurality of catalog surfaces associated with the request, wherein each catalog surface in the plurality of catalog surfaces is a data structure storing a separate set of attribute values for items associated with a corresponding context, and wherein a same item in different catalog surfaces corresponds to different attribute values;

generating, by a result generation module, a result set comprising variations of items corresponding to the catalog surface, comprising:

identifying a set of items based on the request, and for each item of the set of items, adding a record representing a variation of the item using the set of attribute values of the catalog surface associated with the request; and sending, by a content presentation module, the result set to the client device.

11. The non-transitory computer readable storage medium of claim 10, storing a mapping from catalog surfaces to catalog surfaces, wherein the mapping associates a source catalog surface to a target catalog surface, wherein adding the record representing the variation of the item comprises:

for an attribute of the item, checking if an attribute value associated with the source catalog surface is available;

determining that there is no attribute value associated with the source catalog surface for that item; and responsive to determining that there is no attribute value associated with the source catalog surface for that item, using the attribute value associated with the target catalog surface for the item.

12. The non-transitory computer readable storage medium of claim 10, wherein the instructions cause the one or more computer processors to further perform steps comprising:

ingesting attribute values of items from one or more data sources, comprising:

receiving an attribute value for a particular item;

determining a source catalog surface corresponding to the attribute value; and storing the attribute value for the particular item in association with the source catalog surface.

13. The non-transitory computer readable storage medium of claim 12, wherein each data source maps to a catalog surface, wherein determining the catalog surface corresponding to the attribute value comprises:

identifying a data source that provided the attribute value; and determining the catalog surface corresponding to the data source.

14. The non-transitory computer readable storage medium of claim 10, wherein each catalog surface has a catalog surface identifier, wherein each item is represented as a mapping from tuples of attribute identifier and catalog surface identifiers to attribute values.

15. The non-transitory computer readable storage medium of claim 10, wherein an attribute describing the context of the request identifies a client application used for sending the request.

16. The non-transitory computer readable storage medium of claim 10, wherein an attribute describing the context of the request identifies a particular user interface used for sending the request.

17. The non-transitory computer readable storage medium of claim 10, wherein an attribute describing the context of the request represents one or more parameters specified in the request.

18. A computer system comprising:

one or more computer processors; and a non-transitory computer readable storage medium storing instructions that when executed by one or more computer processors cause the one or more computer processors to perform steps comprising:

receiving, by a data collection module via a network interface, from a plurality of data sources, data describing a plurality of items, each item represented as a mapping from attribute identifiers to attribute values, wherein a first set of attribute values of an item is received from a first data source in the plurality of data sources, a second set of attribute values of the item is received from a second data source in the plurality of data sources, the first set of attribute values of the item is different from the second set of attribute values of the item, and each of the first set and second set of attribute values of the item is associated with a distinct catalog surface in a plurality of catalog surfaces;

receiving, by a catalog service from a client application executing on a client device, a request for items;

determining, by the catalog service using a context analysis module, one or more attributes describing a context of the request;

identifying, by the catalog service, based on the determined context, a catalog surface from the plurality of catalog surfaces associated with the request, wherein each catalog surface in the plurality of catalog surfaces is a data structure storing a separate set of attribute values for items associated with a corresponding context, and wherein a same item in different catalog surfaces corresponds to different attribute values;

generating, by a result generation module, a result set comprising variations of items corresponding to the catalog surface, comprising:

identifying a set of items based on the request, and for each item of the set of items, adding a record representing a variation of the item using the set of attribute values of the catalog surface associated with the request; and sending, by a content presentation module, the result set to the client device.

19. The computer system of claim 18, storing a mapping from catalog surfaces to catalog surfaces, wherein the mapping associates a source catalog surface to a target catalog surface, wherein adding the record representing the variation of the item comprises:

for an attribute of the item, checking if an attribute value associated with the source catalog surface is available;

determining that there is no attribute value associated with the source catalog surface for that item; and responsive to determining that there is no attribute value associated with the source catalog surface for that item, using the attribute value associated with the target catalog surface for the item.

20. The computer system of claim 18, wherein the instructions cause the one or more computer processors to further perform steps comprising:

ingesting attribute values of items from one or more data sources, comprising:

receiving an attribute value for a particular item;

determining a source catalog surface corresponding to the attribute value; and storing the attribute value for the particular item in association with the source catalog surface.

* * * * *